Figure 6:
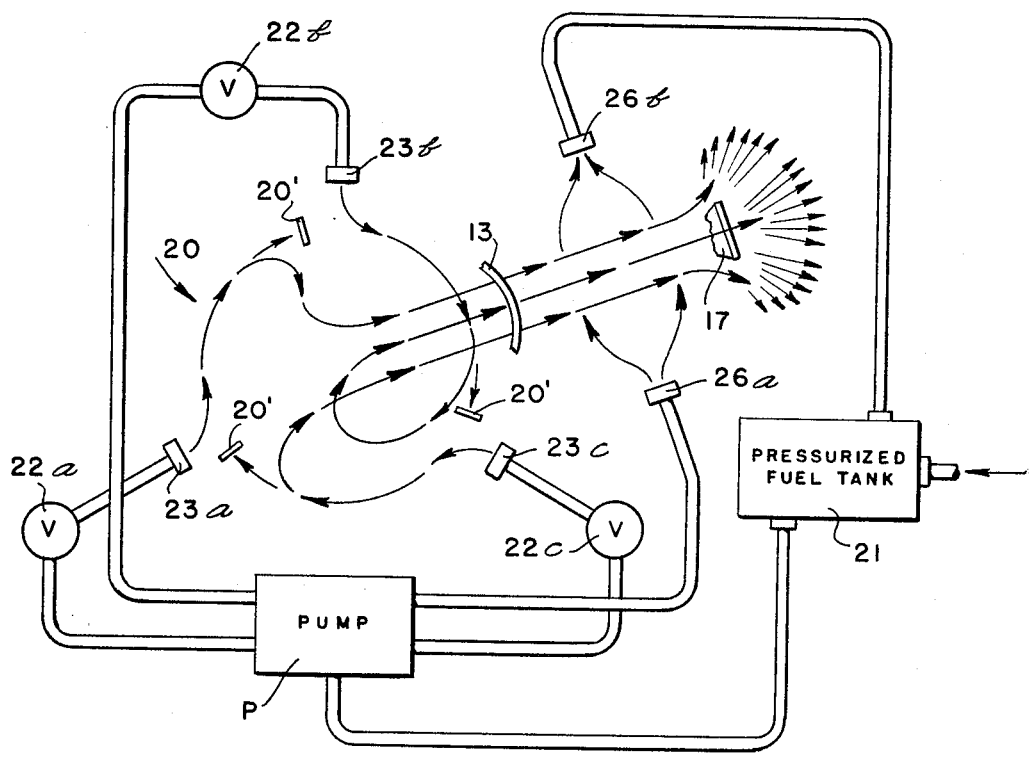

Oct. 18, 1966 N. J. SIPPEL ETAL 3,279,186
THRUST VARIATION AND VECTORING NOZZLE
Filed March 3, 1965 3 Sheets-Sheet 1
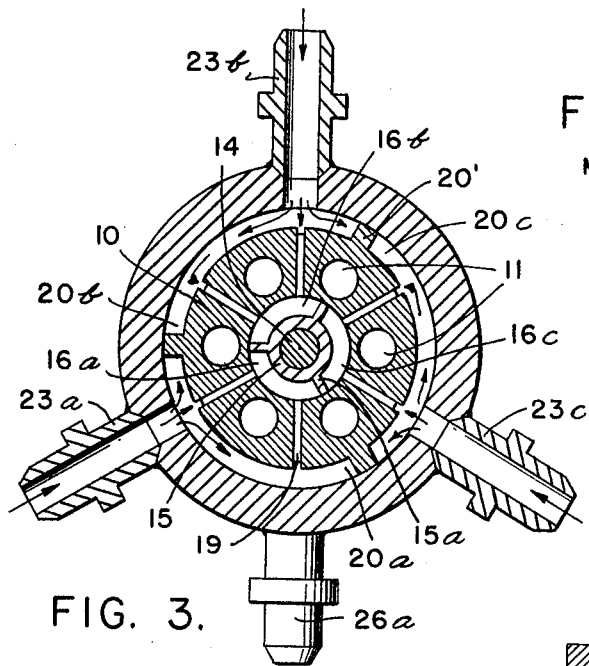
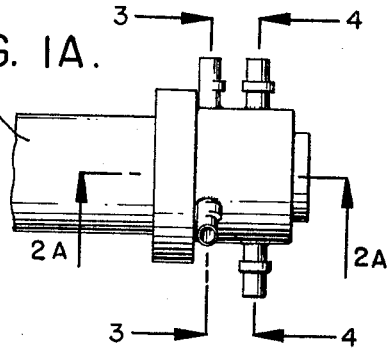
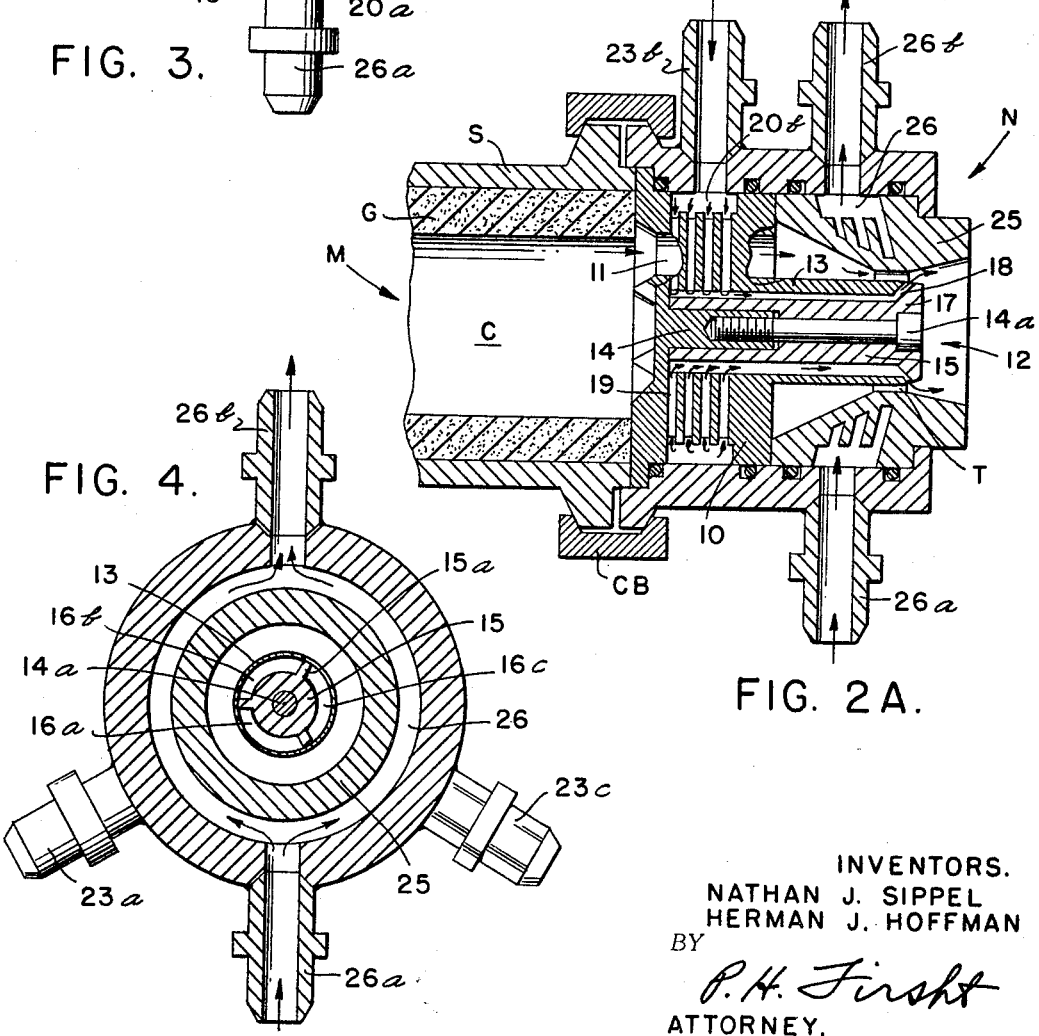
INVENTORS.
NATHAN J. SIPPEL
HERMAN J. HOFFMAN
BY
*P. H. Firsht*
ATTORNEY.

Oct. 18, 1966     N. J. SIPPEL ETAL     3,279,186
THRUST VARIATION AND VECTORING NOZZLE
Filed March 3, 1965     3 Sheets-Sheet 2
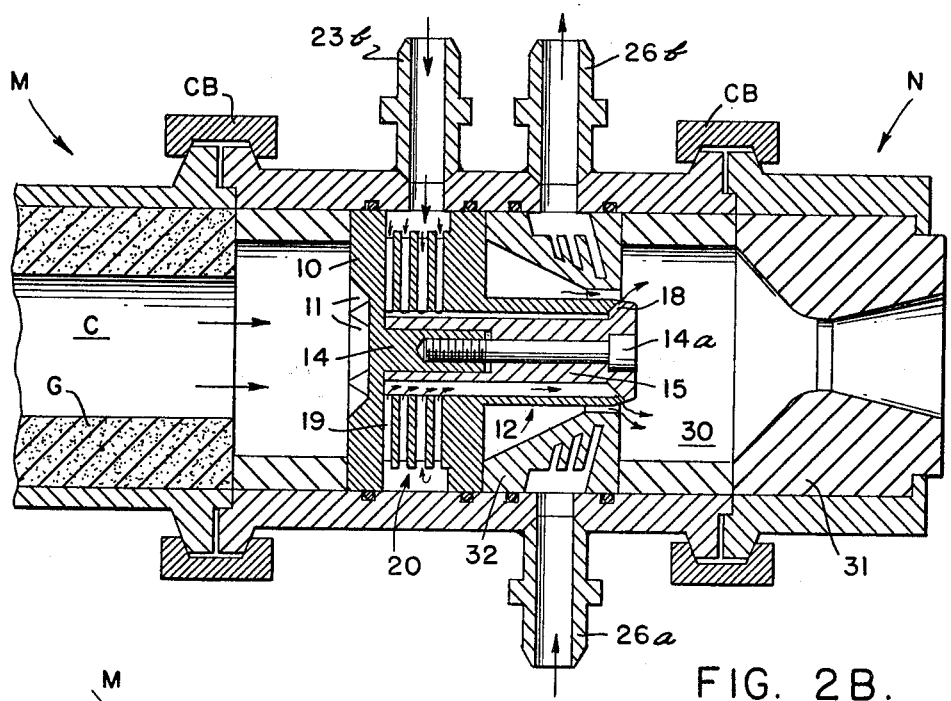
FIG. 2B.
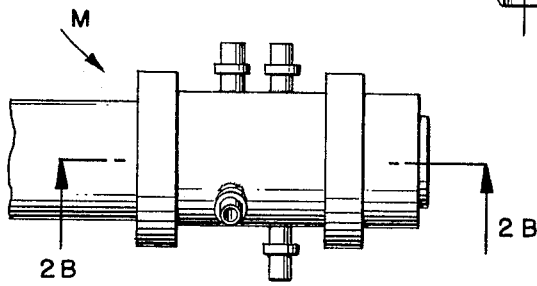
FIG. 1B.
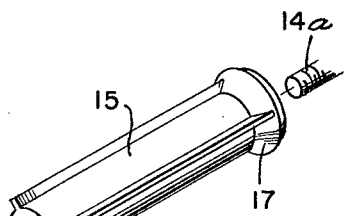
FIG. 5.
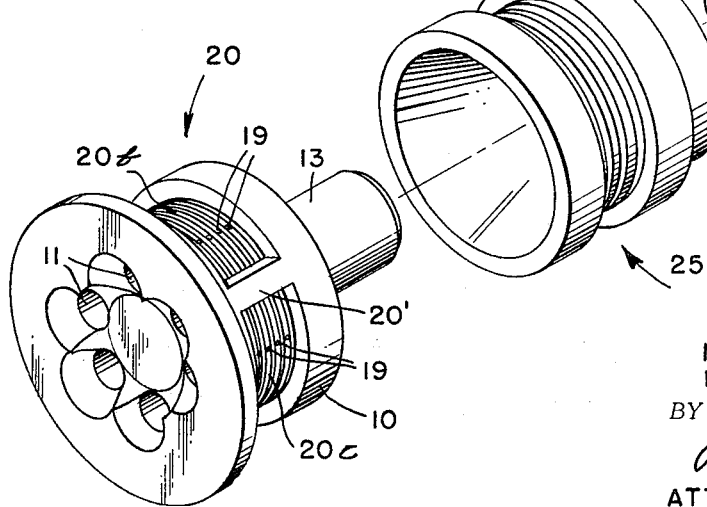
INVENTORS.
NATHAN J. SIPPEL
HERMAN J. HOFFMAN
BY
*P. H. Fisht*
ATTORNEY.

United States Patent Office 3,279,186
Patented Oct. 18, 1966

3,279,186
THRUST VARIATION AND VECTORING NOZZLE
Nathan J. Sippel and Herman J. Hoffman, China Lake, Calif., assignors to the United States of America as represented by the Secretary of the Navy
Filed Mar. 3, 1965, Ser. No. 436,971
8 Claims. (Cl. 60—231)

The invention described herein may be manufactured and used by or for the Government of the United States of America for governmental purposes without the payment of any royalties thereon or therefor.

The present invention relates generally to improvements in reaction motors and more particularly to improved plug or spike nozzle exhaust systems for liquid, solid propellant, and hybrid rocket motors.

Those concerned with the development of exhaust systems have long recognized a need for a simple nozzle system wherein thrust vectoring, or thrust axis deflection, control may be imposed without resorting to conventional mechanical devices, such as, for example, movable jet vanes, gimbaled nozzles and the like, which are inherently complicated subject to erosion and generally inefficient in operation.

Various attempts have been made to overcome the disadvantage of mechanical thrust vectoring devices. Among the more recent approaches to this problem have been attempts to utilize means employing a converging-diverging de Laval type nozzle having included therein means for injecting a fluid into the diverging section of the nozzle downstream of the nozzle's throat in order to create a shock wave for obtaining thrust vectoring control. Such a system is more fully disclosed in copending application Serial No. 215,252, filed August 6, 1962. This technique has proven itself adequate in fulfilling may existing needs. However, as a practical matter it has been found desirable to provide means which utilize the shock wave effect, as described in the copending application, and which also serves to accommodate a reduction in the over-all length of the divergent nozzle section of the de Laval nozzle. Further, variable thrust capabilities are deemed of prime importance to those concerned with the development of rocket motor exhaust systems. This, in the past, has been accomplished by various means including the aforementioned movable spikes, and the like, mounted within the nozzle throat and/or the divergent section of the nozzle. However, due to the required positioning, such devices have been found to be particularly susceptible to corrosion and erosion initiated by the exhaust gases. The effect of the gases acting on the spikes has raised many problems due primarily to the simple fact that movable spikes or plugs must necessarily be subjected to the effects of the hot corrosive exhaust gases and yet retain mobility and preselected dimensions in order to function as desired.

It is the purpose of the present invention to overcome these aforementioned disadvantages through the utilization of a fixed plug nozzle of a type which employs no movable mechanical components, which is simple to operate and control, and which is efficiently cooled during motor operation. In other words, the purpose of the present invention is to provide simple means capable of efficiently achieving the desirable results obtained from several types of reaction motor exhaust system, e.g., thrust augmentation and thrust vectoring, while eliminating the more objectionable features of each of the known types of thrust vectoring and augmentation devices. To attain this, a unique elongated plug or spike is fixed within the throat of a nozzle and provided with a plurality of liquid source-connected chambers or compartments, which terminate in a single jet-forming port formed at the terminus of the plug, whereby a pressurized liquid may be utilized for cooling the plug section and subsequently utilized for selectively establishing a desired shock wave in the exhaust plume as the exhaust exits the throat of the nozzle. Further, the plug may be employed to impart a hybrid characteristic to reaction motors in order to obtain thrust augmentation.

An object of the present invention is to provide in a nozzle section for a reaction motor a liquid-cooled plug capable of imposing thrust vector control on the motor.

Another object is to provide means for augmenting reaction motor thrust levels.

A further object is to provide simple, reliable means capable of imposing either thrust vector control or imparting thrust augmentation to a reaction motor.

Still another object is to provide means for imposing thrust throttling adjacent the nozzle throat without altering the effective area of the throat.

Yet another object is to obtain thrust vectoring at the egress portion of a nozzle throat, and the ingress portion of the divergent nozzle section.

And yet another object is to provide a simplified, lightweight nozzle section having a reduced over-all size.

Other objects, advantages and novel features of the invention will become apparent from the following detailed description of the invention when considered in conjunction with the accompanying drawings wherein:

FIGS. 1A and 1B comprise partial views of different modification of reaction motors which utilize the plug nozzle of the instant invention;

FIGS. 2A and 2B comprise sectional elevations of the motors taken along lines 2A and 2B, respectively, in FIGS. 1A and 1B;

FIG. 3 comprises a cross sectional view taken along lines 3—3 of FIG. 1A, showing the ingress portion of the plug nozzle of the instant invention;

FIG. 4 comprises a cross sectional view taken along 4—4 of FIG. 1A, illustrating the egress portion of the plug nozzle shown in FIG. 3;

FIG. 5 comprises a partially exploded perspective view of the plug nozzle shown in FIGS. 3 and 4; and FIG. 6 comprises a flow diagram, in partial block form, illustrating the flow path of a liquid directed through the plug nozzle of the instant invention.

Referring now to the drawings, wherein like reference characters designate like or corresponding parts throughout the several views, there is shown in FIGS. 1A and 1B partial views of modified exhaust sections for a missile M including therein the plug nozzle of the instant invention, better shown in FIG. 2A through FIG. 5.

Turning now to FIG. 2A, there is shown a cross sectional view of the missile M of FIG. 1A illustrating a combustion chamber C having mounted therein a solid propellant grain G. The missile M includes a shell S having a nozzle section V-band connector CB, which serves to join a mated nozzle section N with the shell S.

The nozzle section N includes a transverse support plate 10, which is mounted across the aft end of the combustion chamber C in a sealed relationship therewith. The plate 10 is provided with a plurality of axially aligned openings or ports 11 extruding through the plate 10 which serve as a combustion chamber exhaust outlet for the exhaust gases generated as the grain G is consumed within the chamber C.

The plate 10 is further provided with an elongated plug, generally designated 12, including a tubular plug housing 13, integrally connected in coaxial alignment with the plate and so disposed as to extend in an aft direction away from the combustion chamber C. The housing 13 is provided with an internal anchor post 14 fixed within the forwardmost portion thereof. This post serves to cooperate with a screw 14a for securing therein an elongated cylinder 15 axially inserted thereinto during plug assembly. The outside diameter of the cylinder 15 is somewhat less than the inside diameter of the housing 13, as illustrated in FIGS. 2A and 5. However, the outermost surface of the cylinder 15 is provided with radially extending, longitudinally disposed fins or vanes 15a, FIG. 5, preferably spaced 120° apart. The outermost longitudinal edges of the vanes 15a sealingly engage the innermost surface of the tubular housing 13 and serve to establish a plurality of elongated compartments 16a, 16b, and 16c, FIG. 3, extending the length of the plug 12.

The outermost ends of the compartments are defined by an integrally formed circular end plate 17 having a chamfered or beveled surface extending diagonally from the outermost surface of the cylinder 15, as more clearly shown in FIG. 2A. The terminal end surface of the housing 13 is also beveled or chamfered to extend parallel the chamfered surface of the plate 17. The length of the housing 13 is such that there is defined between the chamfered surfaces a circular opening 18, which is segmented by the vanes 15a. The opening 18, in practice, comprises a fluid restricting or jet-forming outlet port for the compartments 16a–16c and serves to eject or to "spray" a segmented, disk-shaped jet of pressurized liquid outwardly, in a generally radial direction, about the terminus of the plug 12. It is to be noted that the aft portion of the housing 13 and the circumference surface of the plate 17 is preferably chamfered, at approximately five degrees, in a rearwardly converging direction for accommodating an efficient ejection of fluid from the port or opening 18.

In order to supply a pressurized fluid or liquid to the sealed chamber 16a–16c, a plurality of radially disposed ports or fluid conduits 19 extend radially through the plate 10, between the ports 11, from each compartment and terminate in sealed, segmented, annular cooling chamber, generally designated 20 in FIG. 5, and segmented by means of 20' into sealed compartments 20a, 20b, and 20c. Each of these compartments extend approximately 120° along the periphery portion of the plate 10. Hence, it is to be understood that each of the compartments 16a–16c communicate with a selected one of the compartments 20a–20c through given conduits 19. Consequently, it is to be further understood that the pressurization of the fluid within any given one of the compartments 16a–16c depends directly upon the pressurization of the fluid present within a connected one of the compartments 20a–20c.

Each of the chambers 20a–20c is, in turn, separately connected with a pressurized source of liquid 21, schematically shown in FIG. 6, through plumbing including fluid flow control valves 22a–22c and input ports 23a–23c, FIG. 6. Where desired, a fluid pressurizing pump P may be included within the plumbing and disposed between the valves 22a–22c and the source of liquid 21 in order to maintain an accurate relative level of pressures within the system. In view of the foregoing, it will be understood that the velocity with which a liquid is caused to exit a given one of the compartments 16a–16c through the restricted opening 18 is controlled through a selective manipulation of a given one of the valves 22a–22c. With particular reference to the flow diagram of FIG. 6, it will be appreciated that at given periods during the motor's operation, the velocity of a selected 120° portion of the circular jet of liquid established at the opening 18 may be varied independently of the remaining portions of the jet, merely through altering the rate of flow through an associated one of the valves 22a–22c.

Referring back to FIG. 2A, the nozzle section N includes a concentrically aligned tubular nozzle member 25 radially spaced from the outer surfaces of the plug 12. The member 25 is so formed as to be provided with a convergent and divergent section and a throat T, which terminates at the terminus of the plug housing 13, whereby the pressurized jet of liquid may be introduced from the opening 18 into the diverging portion of the nozzle 25 at the upstream end thereof. The convergent or ingress portion of the nozzle 25 is mated with the plate 10 in a manner such that the converging portion of the nozzle 25 surrounds the exit ends of all of the ports 11. Hence, it will be appreciated that as the grain G is burned in the combustion chamber C, a stream of exhaust gases is expelled from the chamber C, through the ports 11, then constricted to flow along the surface of the plug 12, at the nozzle throat T, and subsequently expanded in the diverging portion of the nozzle 25 in a conventional manner as it exits the throat T and passes from the end of the plug housing 13. As heated gases pass through the nozzle 25, the nozzle structure tends to absorb great quantities of heat. Therefore, the nozzle section N is provided with a cooling system, FIGS. 2A, 4 and 6, including an annular chamber 26, formed within the peripheral portion of the nozzle member 25 and communicating with a source of circulating coolant through an inlet port 26a and an outlet port 26b, where the coolant is caused to circulate through the chamber 26. The source of coolant may, if desired, comprise the source of the liquid forced into the chambers 16a–16c, FIG. 6.

The operation of the modification of FIGS. 1A and 2A is as follows; the grain G is ignited, by any suitable means, for thus establishing a supersonic stream of exhaust gases extending through the ports 11, about the outer surfaces of the plug housing 13, thereby imparting a tubular or doughnut-shaped cross sectional configuration thereto. The tubular stream then passes into and expands within the diverging portion of the nozzle 25. During the motor's operation, the valves 22a–22c are uniformly opened to establish a uniformly pressurized flow of liquid into the compartments 16a–16c. In practice, a liquid propellant ingredient, is forced into the chambers 16a–16c. In response to the flow of liquid into the chambers 16a–16c, a radially directed and generally vertically aligned, disk-shaped jet of the liquid is established at the opening 18 causing liquid under pressure to flow or jet into the forwardmost end of the diverging portion of the nozzle 25, at the downstream end of the throat T. As the liquid emerges from the opening 18 it is necessarily injected into the supersonic exhaust stream at the stream's innermost boundary. The injection of the liquid establishes a rearwardly directed, conical shock front within the nozzle's diverging portion. While the shock front phenomena is not completely understood, it has been found that so long as the velocity of the fluid within the jet is uniform, no thrust vectoring will be achieved. However, when side thrust is required, a selected one of the valves 22a–22c may be manipulated for changing or modifying the velocity of the fluid passing through a given segment of the opening 18 from an associated one of the chambers 16a–16c. The thus established changes in fluid velocity serve to alter the configuration of the established shock front, whereupon a predetermined side force is established and thrust vectoring achieved.

Where desired, the structure shown in FIGS. 2A, 3 and 5 may be modified by eliminating the valves 22a and including a valving mechanism, not shown, which comprise means for achieving a positive opening and closing of the segments of the port 18 for effecting changes in the configuration of the established shock front. The structure may be further modified to include a pair of conduits, also not shown, near the aft end of the compartments extending from compartments 20a and 20c into 20b, whereby fluid forced into compartments 20a and 20c, near the forward end thereof through ports 22a and 22c may be conducted in an aft direction along compartments 20a and 20c and thence through the pair of conduits into the compartment 20b, near the aft end thereof. The fluid will now be conducted in a forward direction through compartment 20b and exit, rather than enter, through port 23b. Consequently, it will be appreciated that only ports 23a and 23c may be caused to serve as inlet or input ports, while the port 23b will be caused to function as an exit port for the fluid as it emerges from the compartment 20b through the associated fluid conduits 19. Through the use of the foregoing modifications, additional positively controlled jet forming ports may be provided and utilized within the compartments 20a–20c and adapted to communicate with the combustion chamber C, near the forward portion of the plate 10, whereby fluid, in the form of a fuel or oxidizer, may be injected in a controlled manner into the combustion chamber C, as well as through the port 18, for enhancing the burning of the grain G.

However, in order to achieve thrust augmentation, it is preferred that the nozzle section N be modified to achieve a hybrid motor thrust augmentation function through the use of the plug 12 as illustrated in FIGS. 2A and 2B. This is effected by utilizing the plug 12 to inject a liquid propellant into the stream of exhaust gases to establish a secondary burning of the solid propellant ingredient as the exhaust gases pass oxidizer or fuel-rich gases beyond the end of the plug 12.

This modification requires a secondary combustion or expansion chamber 30, interposed between the plug 12 and the convergent portion of a nozzle 31, of the de Laval type. The stream of exhaust gases is constricted in the manner heretofore described, as it exits ports 11, by a constricting member 32 which is similar in design to the nozzle 25 of FIG. 1B. However, the member 32 is not provided with a divergent nozzle portion, as is the nozzle member 25, in order that the gases of the stream may be rapidly expanded as the stream passes across the opening 18 of the plug 12. It is to be understood that alternate points of fuel or oxidizer injection for thrust augmentation may be established at the forward face of plate 10, toward chamber C, or into the convergent section of nozzle 12 from a point along the surfaces of members 13 and 32.

In the operation of the nozzle portion N of FIGS. 2A and 2B, the exhaust gases pass from the chamber C in an oxidizer or fuel-rich state. The stream of gases is constricted to flow along the plug 12 and across the jet-forming port 18, whereat a controlled flow of liquid propellant is introduced into the stream, whereby a hypergolic reaction is thus effected. The oxidizer or fuel-rich gases are thus caused to undergo a secondary burning thus completing the combustion in chamber 30. Thrust will be varied by controlling the mass addition of liquid which may also act as a carrier for a dense material, such as, for example, powdered metal, etc., which would further enhance thrust augmentation.

Obviously many modifications and variations of the present invention are possible in the light of the above teachings. It is therefore to be understood that within the scope of the appended claims the invention may be practiced otherwise than as specifically described.

What is claimed is:

1. A plug nozzle for a reaction motor comprising, in combination:
   a support plate including means defining a plurality of axially directed and equally spaced exhaust openings arranged about the circumference of said plate adapted to accept motor exhaust gases and pass a stream of exhaust gases therefrom;
   an elongated injection plug integrally connected with said plate extending laterally from said plate in coaxial alignment therewith, including means defining a plurality of internally arranged, adjacent and elongated fluid conducting compartments extending longitudinally along the internal length thereof;
   fluid diverting means mounted at the extended, outermost end of said elongated plug aligned in a transverse relationship with respect to said compartments including means defining about the circumference of said outermost end of said plug a transversely aligned, laterally directed fluid restricting port communicating with said compartments and adapted to accommodate a restricted passage of fluid from said compartments;
   an exhaust stream constriction means concentrically arranged about said plug and integrally connected with said plate adjacent said ports adapted to accept the stream of motor exhaust gases passed from said ports and confining said stream of gases to a flow path extending from said ports along the length of the outermost surfaces of said plug; and
   a fluid flow control system including means adapted to selectively force a selected fluid into said compartments, whereby a radially directed flow of fluid may be injected into said stream of exhaust gases at the outermost end of said plug for thus causing said stream of exhaust gases to be subjected to a fluid injected thereinto along its innermost boundary.

2. The combination according to claim 1, further characterized in that said constriction means includes:
   a tubular member including a first internal exhaust directing surface of a generally frusto-conical configuration concentrically disposed about said plug and radially displaced therefrom, having its base portion disposed to surround the exit portions of said ports, and a second internal exhaust directing surface of a cylindrical configuration disposed adjacent to and integrally connected at a first end portion thereof with the apex portion of said first surface for thus defining a cylindrical throat extending between the second exhaust directing surface and the outermost surface of said injection plug and terminating adjacent said fluid diverting means.

3. The combination of claim 1, further characterized in that said constriction means further includes:
   means defining a third exhaust directing surface of a generally frusto-conical configuration coaxially aligned and integrally connected at its apex portion with a second end portion of said second exhaust directing surface with the base portion thereof longitudinally displaced from said fluid diverting means.

4. A nozzle section for a reaction motor comprising, in combination:
   a fixed support plate arranged adjacent a propellant combustion chamber including equally spaced exhaust ports extending axially through said plate and radially aligned at equal distances from the center of said plate about the peripheral portion thereof, adapted to accept motor exhaust gases from said combustion chamber and pass an axially directed stream of exhaust gases therefrom;
   an elongated injection plug integrally connected with said plate extending laterally therefrom and in coaxial alignment therewith, including means defining a plurality of elongated, liquid conducting compartments arranged in circular, parallel alignment extending the internal length of said plug;
   fluid diverting means comprising a circular plate-like member having a beveled peripheral portion mounted at the extended and outermost end of said laterally extending plug and aligned in transverse relationship therewith, in a manner such that said beveled surface comprises means defining a transversely aligned, radially directed fluid restricting port communicating with said compartments and adapted to accommodate a restricted flow of liquid from said compartments;
   a laterally extending exhaust stream constricting means concentrically arranged about said plug and integrally connected with said plate in a surrounding relationship with respect to the exit portions of said ports and including means defining an elongated internal surface extending from said plate in coaxial alignment with said plug, comprising gas stream confining coaxially aligned surface sections including, an ingress section having a generally frusto-conical configuration with the base thereof disposed adjacent said plate, an egress section having a generally frusto-conical configuration, and a throat section of a cylindrical configuration having one end terminating adjacent said fluid restricting port and integrally connecting the apex portions of said ingress and egress sections of said constricting means in a manner such that the stream of exhaust gases is caused to enter said constricting means at said ingress section, be confined in the throat section, and exit said constricting means at the egress section;

a pressurized liquid conducting system connected with said compartments in displaced relationship with respect to said restricting port and including a plurality of liquid confining chambers surrounding said ports and separately connected with preselected liquid conducting compartments;

a plurality of fluid conduits separately connected with said fluid conduits;

a plurality of fluid flow control valves separately connected with said fluid conduits; and a common pressurized source of liquid connected with the plurality of fluid flow valves, whereby the stream of exhaust gases may pass from said combustion chambers and be constricted about said plug in the throat of said constricting means and subjected to a variable flow of liquid transversely injected at its innermost boundary.

5. In a rocket motor, means comprising in combination:

a tubular rocket motor housing having defined therein a first propellant combustion chamber and a coaxially aligned exhaust nozzle section including means defining an exhaust nozzle throat extending axially therethrough;

a transversely aligned support plate mounted within said housing and disposed at right angles with respect to said throat and in displaced relationship therewith;

means defining a plurality of equally spaced and axially aligned exhaust ports arranged about the circumference of said plate to extend from said first combustion chamber through said support plate and adapted to direct exhaust gases from said first combustion chamber through said plate as the gases are caused to be expelled therefrom at supersonic velocity;

a tubular fluid conduit integrally connected with said plate in coaxial alignment therewith and disposed to extend toward the nozzle section along the longitudinal axis of said housing and having a terminal point disposed between said plate and said nozzle section for thereby defining a secondary combustion chamber therebetween;

a cylindrical plug member having a plurality of elongated radial fins extending from the external surface thereof, and a radially directed, diversion flange member including a beveled surface fixed across one end of the plug with the beveled surface thereof extending between said radial fins;

means mounting said plug member within said tubular chamber in concentric alignment therewith and in a manner such that diversion flange member is displaced slightly from the outermost end of said fluid conduit, for thereby defining an exit port, and with the outermost longitudinal edges of said fins being disposed in sealing engagement with the internal surfaces of said fluid conduit, whereby within said conduit there is defined a plurality of separate elongated conduits extending the length of said plug and terminating at the beveled surface of said diversion flange member adjacent the exit port;

an exhaust stream constricting block including an internal exhaust directing surface of a generally frusto-conical configuration mounted in a surrounding and spaced relationship with respect to said tubular conduit and disposed between said plate and said secondary combustion chamber adapted to receive a stream of exhaust gases flowing with a supersonic velocity through said exhaust ports and constrict the flow thereof near the outermost end of said tubular conduit as the gases exist said block and flow with supersonic velocity into said secondary combustion chamber;

means defining an annular coolant chamber arranged about said constriction block;

connecting means connecting said coolant chamber within a fluid transfer system including a source of preselected liqiud coolant, whereby the coolant may be directed through said housing;

a source of pressurized liquid hybrid propellant ingredient;

connecting means connecting said source of pressurized ingredient with said plurality of elongated conduits arranged within said elongated tubular conduit, whereby the pressurized ingredient may be directed in a flow from said source through said conduits and ejected from said exit port in a radial direction into the restricted stream of exhaust gases as the gases exit said constricting block; and means for selectively varying the flow of pressurized ingredient through each of the separate conduits of the plurality of conduits, whereby combustion is effected by hypergolic reaction for augmenting motor thrust as the resulting gases of combustion are caused to exit said nozzle throat.

6. The combination of claim 5 further characterized in that said connecting means connecting said source of pressurized ingredient with said plurality of conduits includes a plurality of plate cooling chambers arranged about the circumference of said support plate;

means defining tubular openings extending from said plate cooling chambers to said plurality of conduits;

tubular fluid conduits connecting said plate cooling chambers with said source of pressurized ingredient; and selectively operable valve means arranged within said tubular fluid conduits and disposed between said source of pressurized ingredient and said plate cooling chambers adapted to impose selective control on the flow of pressurized ingredient therebetween.

7. In a reaction motor, means including, in combination:

a rocket motor housing;

an elongated solid propellant-burning combustion chamber defined within said housing;

a convergent-divergent exhaust nozzle section mounted in longitudinally displaced, coaxial alignment with respect to said solid propellant combustion chamber;

a transversely aligned support plate fixed within said housing adjacent said combustion chamber including a compartmented nozzle plug comprising a plurality of adjacent and separate conduits arranged to extend toward said nozzle section and terminating at an end point longitudinally displaced from the convergent portion of the convergent-divergent nozzle section, whereby a secondary combustion chamber is caused to be defined therebetween;

constricting means concentrically arranged about said plug adapted to direct along the outer surfaces of said plug toward said secondary combustion chamber a stream of exhaust gases generated in said combustion chamber, and including means for effectively constricting said stream as it exists the constricting means and emerges into the said secondary combustion chamber;

a pressurized oxidizer conducting system connected with said separate conduits adapted to force an oxidizer under pressure into said conduits; and injection means coupled with said conduits comprising an open annular port arranged about said end point adapted to accommodate a restricted passage of the pressurized oxidizer for establishing a radially-directed, annular jet of pressurized oxidizer and for directing said pressurized oxidizer outwardly into said stream of exhaust gases as it emerges into said secondary combustion chamber.

8. The combination of claim 7, further including selectively operable means adapted to vary the quantity of oxidizer injected into said stream of exhaust gases.

References Cited by the Examiner
UNITED STATES PATENTS 2,793,493  5/1957  Kadosch et al. _____ 60—35.54
3,132,475  5/1964  Hopper _____ 60—35.6

MARK NEWMAN, *Primary Examiner.*